March 6, 1934.　　　O. A. CAUSEY　　　1,949,926

TWO-WAY LOCKING FAUCET

Filed Aug. 20, 1932

INVENTOR
Otis A. Causey
BY
ATTORNEY

Patented Mar. 6, 1934

1,949,926

UNITED STATES PATENT OFFICE 1,949,926

TWO-WAY LOCKING FAUCET

Otis A. Causey, Crows Landing, Calif.

Application August 20, 1932, Serial No. 629,655

4 Claims. (Cl. 251—6)

This invention relates to faucets for use particularly in connection with gasoline or oil drums which are frequently disposed out in the open, where the faucets are exposed to manipulation by dishonest persons intent on stealing the contents of the drums or even the faucets themselves.

The principal object of my invention therefore is to prevent such theft by providing a faucet for the purpose having manually operable means for positively locking the plug or valve of the faucet in a closed position and against removal; and having also an automatically functioning locking means to prevent removal of the faucet from the drum when the plug is locked. In this manner opening of the faucet or removing of the same from the drum by an unauthorized person is positively prevented unless the lock is actually picked—an operation which the usual run of petty thieves is not capable of performing.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawing similar characters of reference indicate corresponding parts in the several views.

Figure 1:
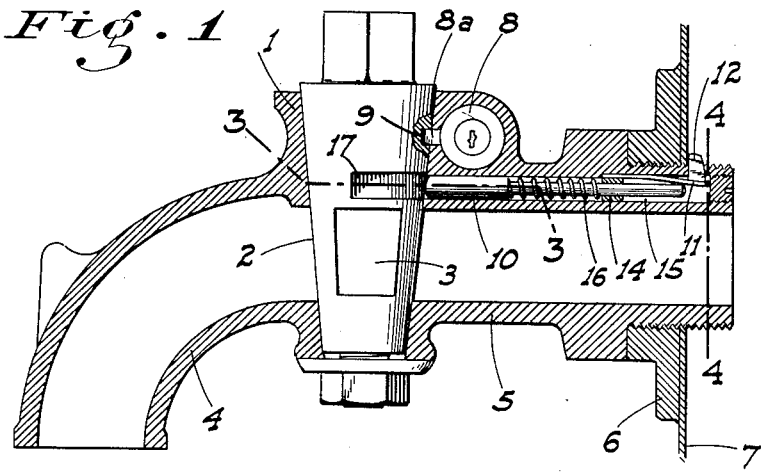
Fig. 1 is a sectional elevation of my improved faucet with the plug closed and locked.
Figure 2:
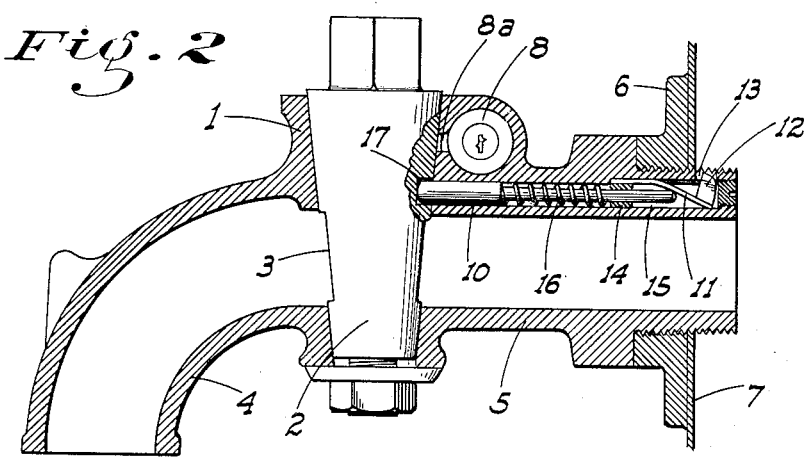
Fig. 2 is a similar view of the plug open.

Referring now more particularly to the characters of reference on the drawing, the numeral 1 denotes the body of the faucet in which the taper plug 2 of the usual character is turnably mounted, said plug having a transverse passage 3 therethrough to establish communication between the nozzle 4 of the faucet and the tubular shank 5. The shank is threaded at its outer end for screw connection with the tapped collar 6 which is secured to the drum 7 as usual.

Mounted in the body at a convenient point is a lock structure preferably of the multiple tubular type indicated at 8, which has a lock bolt 8a projecting therefrom and disposed radially of the plug so as to engage a socket 9 in one side of the same. The socket is positioned relative to the passage 3 so that the bolt will engage the socket only when the plug is turned to a closed position.

Slidably mounted in the shank and disposed radially of the plug is a pin 10 constantly bearing at one end against the periphery of the plug. The opposite end of the pin bears against an inwardly sloping flat spring 11 which extends lengthwise of the shank and at its rear free end supports a rigid lug 12. This lug extends radially of the shank and projects through an opening 13 cut through the threaded portion thereof just inwardly of the drum.

The opposite end of the spring is preferably held against movement by a guide bushing 14 for the pin which is pressed into the passage 15 in which the pin and the spring 11 are mounted. The bushing also serves as an abutment for one end of a spring 16 which acts to press the pin constantly against the plug.

Figure 3:
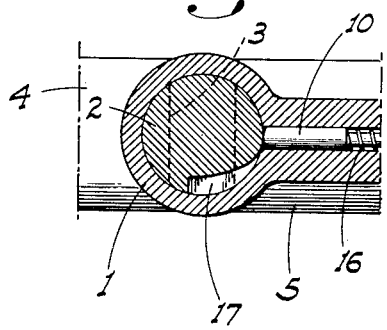
Fig. 3 is a fragmentary sectional plan on the line 3—3 of Fig. 1.
Figure 4:
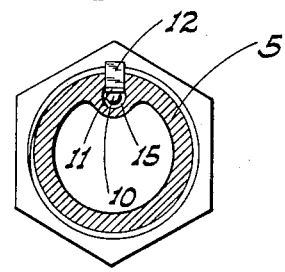
Fig. 4 is a cross section of the line 4—4 of Fig. 1.

Cut in the periphery of the plug in the plane of the pin is an eccentrically disposed groove 17 in which the adjacent pin rides. This groove is arranged so that when the plug is closed the pin then engages the actual periphery of the plug as shown in Fig. 3, and is pushed back so as to engage and raise the sloping portion of the spring 11, causing the lug 12 to project outwardly from the shank and beyond the threads. The lug 12 therefore forms a lock bolt which prevents the faucet from being unscrewed from the collar 6.

When the plug is turned to an open position the pin follows the contour of the gradually deepening groove 17 and is retracted from the spring 11. The latter is then free to function to move inwardly of the passage 15, thus withdrawing the lug 12 inwardly of the shank threads and permitting the plug to be unscrewed and removed should it be desired to do so.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. In a faucet having a shank threaded at one end to removably project through a tapped drum or like collar, and having a plug movable to open or closed positions, a lock bolt mounted in the shank for movement outwardly and radially thereof back of the collar, and means controlled by the movement of the plug to a closed position for thus moving the bolt outwardly.

2. In a faucet having a shank threaded at one end to removably project through a tapped drum or like collar, and having a plug turnable to open or closed positions, a lock bolt mounted in the shank for movement outwardly and radially of the shank back to the collar, means acting to move the bolt to a retracted position in the shank, and means controlled by the turning of the plug to a closed position for advancing the bolt against the resistance of the retracting means.

3. In a faucet having a shank threaded at one end to removably project through a tapped drum or like collar, and having a plug turnable to open or closed positions, a lock bolt mounted in the shank for movement outwardly and radially of the shank back to the collar, means acting to move the bolt to a retracted position in the shank, a pin slidably mounted in the shank lengthwise thereof between the plug and bolt and disposed radially of the plug and means holding one end of the pin against the plug, the latter having a circumferential groove in which the said end of the pin rides which deepens in the direction of opening movement of the plug whereby as the plug is opened the pin will move lengthwise of the shank and away from the bolt; said bolt retracting means being adapted to be engaged by the adjacent end of the pin to cause the bolt to be moved outwardly and beyond the threads of the shank by the movement of the pin had with the turning of the plug to a closed position.

4. In a faucet having a shank threaded at one end to removably project through a tapped drum or like collar, and having a plug turnable to open or closed positions, a lock bolt mounted in the shank for movement outwardly and radially of the shank back of the collar, a flat spring secured at its free end to the inner end of the bolt and extending thence lengthwise in the shank and formed with an outward slope toward its opposite end, a pin slidably mounted in the shank lengthwise of said spring, the pin bearing at one end against the sloping portion of the spring and at its other end against the periphery of the plug, and means formed with the plug to cause the pin to be advanced against said spring when the plug is turned to a closed position whereby to force the bolt outwardly.

OTIS A. CAUSEY.